United States Patent [19]

Ketting et al.

[11] Patent Number: 5,704,697
[45] Date of Patent: Jan. 6, 1998

[54] CHAIN LINK FOR A TRACTION CHAIN

[75] Inventors: Michael Ketting, Ennepetal; Christoph Pietzsch, Lengenfeld, both of Germany

[73] Assignee: Intertractor Aktiengesellschaft, Gevelsberg, Germany

[21] Appl. No.: 501,086

[22] PCT Filed: Feb. 2, 1994

[86] PCT No.: PCT/DE94/00110

§ 371 Date: Aug. 2, 1995

§ 102(e) Date: Aug. 2, 1995

[87] PCT Pub. No.: WO94/18053

PCT Pub. Date: Aug. 18, 1994

[30] Foreign Application Priority Data

Feb. 10, 1993 [DE] Germany ............ 43 03 785.2

[51] Int. Cl.⁶ .................................................. B62D 55/18
[52] U.S. Cl. ........................... 305/193; 305/196; 305/199
[58] Field of Search .................. 305/38, 39, 57, 305/58 R, 58 PC, 59, 169, 173, 174, 185, 188, 190, 193, 194, 195, 196, 198, 200, 201, 202, 203, 204, 199; 295/31.1

[56] References Cited

U.S. PATENT DOCUMENTS 3,272,550   9/1966   Peterson ................. 295/31.1
3,539,230  11/1970   Cornellas ............... 305/193 X
4,294,482  10/1981   Scheffel ................ 295/31.1 X
4,423,910   1/1984   Nazang ................. 305/190

OTHER PUBLICATIONS

"Theoretical principles to optimize the running surface of chain links for track assemblies" by Michael Ketting. Germany 1996.

Primary Examiner—Russell D. Stormer
Attorney, Agent, or Firm—Herbert Dubno; Andrew Wilford

[57] ABSTRACT

A rotatable drive/support element having a support surface is used with a chain link having a hardened running surface extending in and adapted to ride in a travel direction on the support surface and a side surface also extending in the travel direction and normally out of contact with the element. The running surface has a predetermined width b and is formed of at least one edge region of an outwardly convex arcuate shape seen in the travel direction having a radius R of curvature and a respective corner region extending from the edge region to the side region and of an outwardly convex arcuate shape seen in the travel direction having a radius r of curvature. Herein r/b≅0.05 to 0.11, and preferably R/b≅2.4 to 3.1.

11 Claims, 15 Drawing Sheets

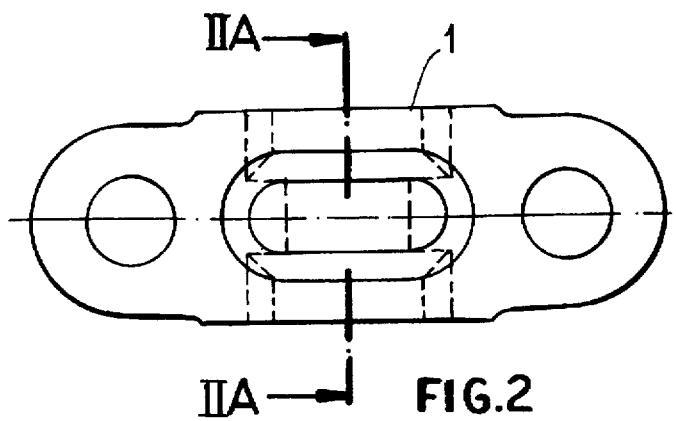
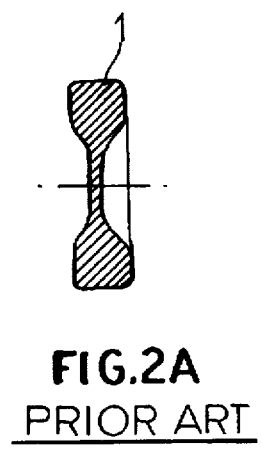
FIG.2 PRIOR ART
FIG.2A PRIOR ART
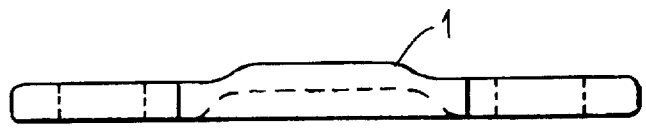
FIG.2B PRIOR ART
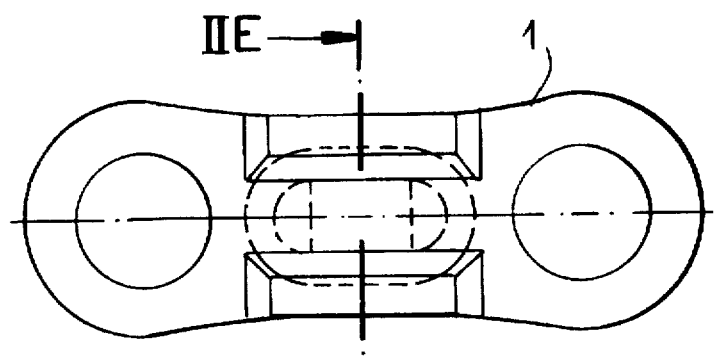
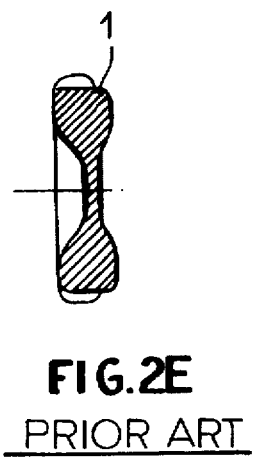
FIG.2D PRIOR ART
FIG.2E PRIOR ART
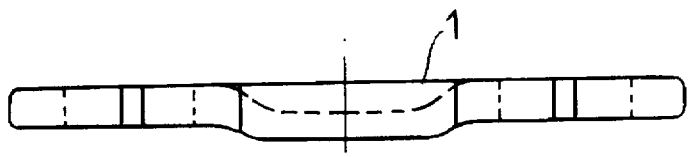
FIG.2F PRIOR ART

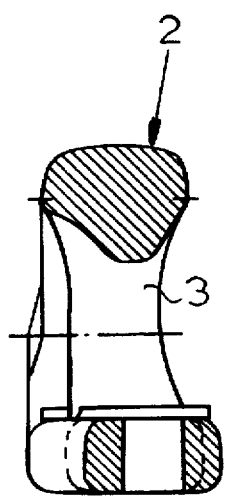
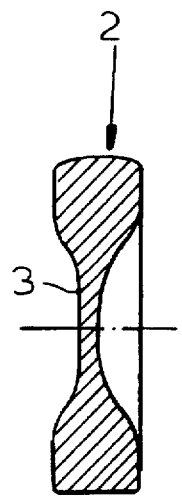
FIG.3  FIG.3A
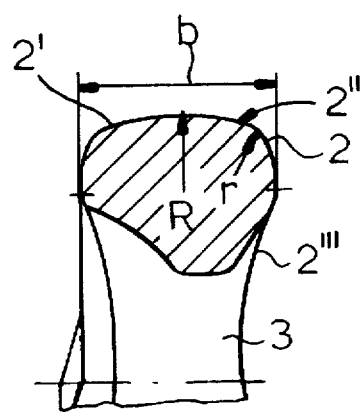
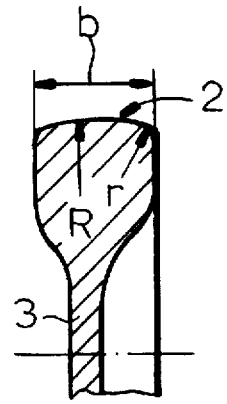
FIG.4  FIG.4A
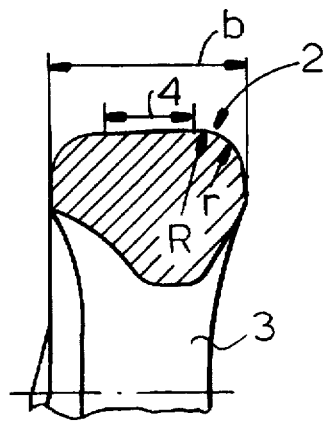
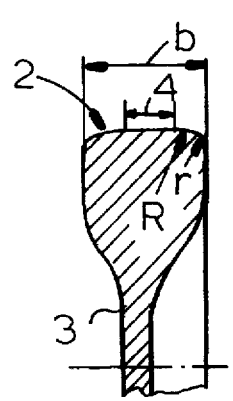
FIG.5  FIG.5A

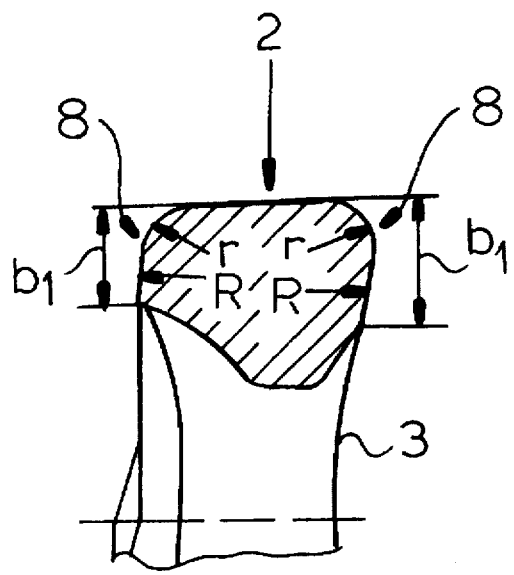
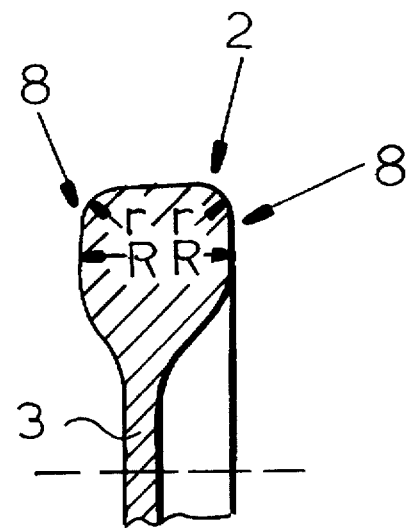
FIG.8      FIG.8A
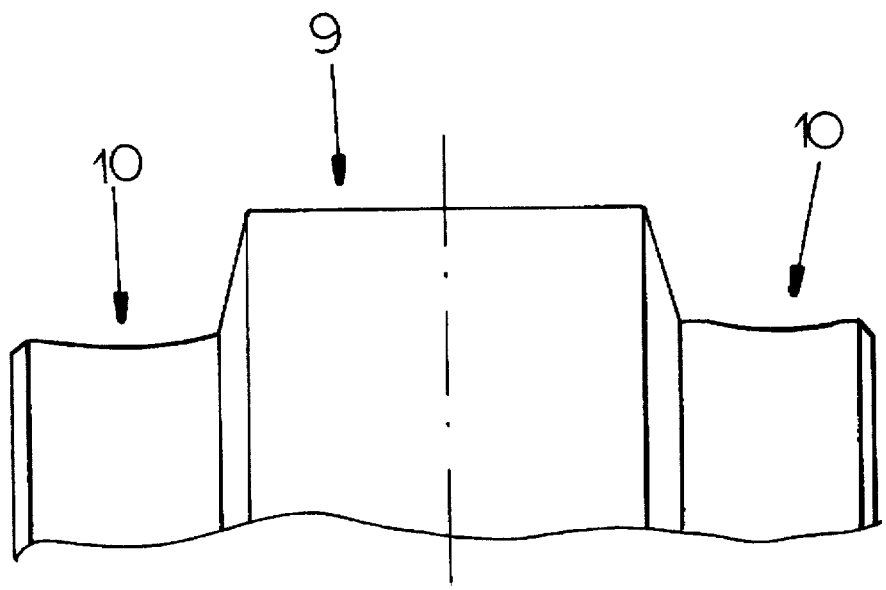
FIG.9

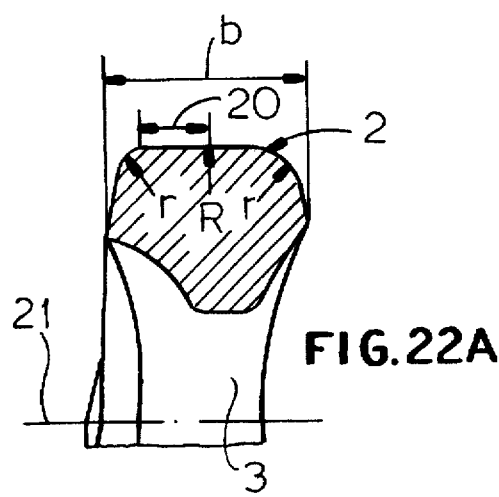
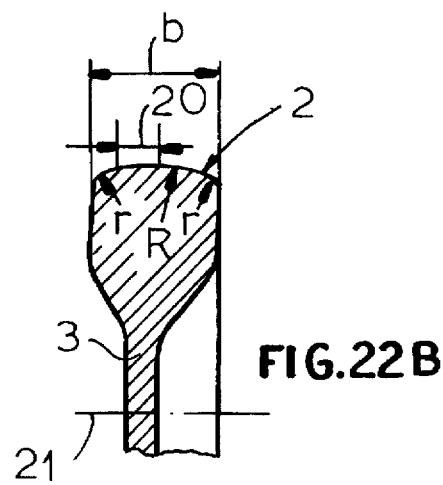
FIG. 22A  FIG. 22B
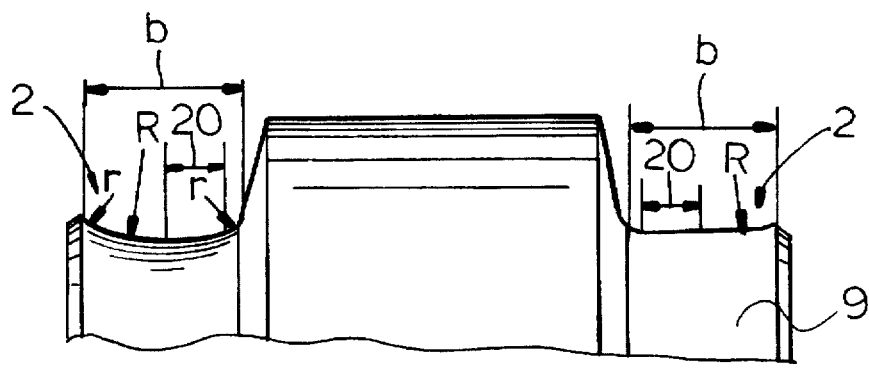
FIG. 23
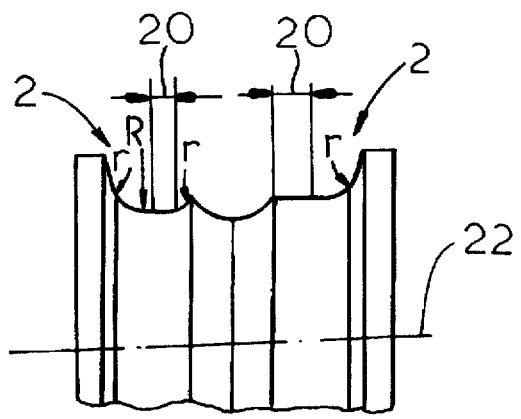
FIG. 24

1

CHAIN LINK FOR A TRACTION CHAIN

CROSS REFERENCE TO RELATED APPLICATIONS

This application is the US national phase of PCT application PCT/DE94/00110 filed Feb. 2, 1994 with a claim to the priority of German application P 43 03 785.2 filed Feb. 10, 1993.

FIELD OF THE INVENTION

The invention relates to a chain link for a traction chain, for example an offset model, conveyor chain, for example a straight model, or for similar chain types as well as a guide wheel for guiding and/or deflecting or tensioning conveyor chains, transport chains, or similar chain models as well as a support roller for supporting and guiding traction chains, transport chains, and/or similar types of chains as well as guide rollers to ensure the rolling and force transmission in mechanisms using traction chains, transport chains, and or chain-like systems and functions.

BACKGROUND OF THE INVENTION

Such elements are known in many types in the state of the art. With the known elements the running surface region usually has a linear or nearly linear shape so that nearly horizontal straight-line running surfaces are formed on the engaging surfaces of the parts. This construction is kinematically good mainly with regard to the movements between guide wheel, support roller, and chain link but this known construction is poor with respect to optimal strength and wear in use. With elements made according to the known state of the art the pressures occurring in use result in breaking-out or spalling of the edges in particular of the chain link due to the force distribution.

OBJECTS OF THE INVENTION

Starting from this state of the art it is an object of the invention to provide elements of the described type wherein the pressures created in normal use are mainly directed along force vectors which run radially to the running surface of the chain link or radially to the running surface of the guide wheel or of the support roller or running roller or that are directed inwardly into inner regions of the guide wheel or support roller, not however toward the edges of the running surfaces of the chain link, guide wheel, or running or support roller.

SUMMARY OF THE INVENTION

These objects are attained by a chain link usable a rotatable drive/support element having a support surface. The chain link has a hardened running surface extending in and adapted to ride in a travel direction on the support surface and a side surface also extending in the travel direction and normally out of contact with the element. The running surface has a predetermined width b and is formed of at least one edge region of an outwardly convex arcuate shape seen in the travel direction having a radius R of curvature and a respective corner region extending from the edge region to the side region and of an outwardly convex arcuate shape seen in the travel direction having a radius r of curvature. Herein $r/b \cong 0.05$ to 0.11, and preferably $R/b \cong 2.4$ to 3.1.

The combination wherein the running surface has adjacent the edge region a noncurved region.

Since the running surface of the chain link is formed so that the forces occurring in use are directed generally radially to the pivot axis of the link or toward the interior of the link, a wear- and above all strength-optimal shape is achieved or the shape forms itself at least after relatively short loading in use.

More particularly according to the invention $R/b \cong 2.4$ and $r/b \cong 0.075$ to 0.11. In addition the entire running surface is of convex arcuate shape seen in the travel direction. The running surface has two such side surfaces, two such edge regions adjacent the side surfaces, and two such corner regions each joining a respective one of the edge regions to the respective corner region. Furthermore the running surface is formed between the edge regions with a substantially flat center region.

In accordance with other features of the invention the two edge regions join centrally on the running surface so that the entire running surface is arcuate. The support surface has a shape generally complementary to the edge and corner regions of the running surface.

The permissible hardness of the running surface lies between 30 and 60 HRc, preferably between 40 and 50 HRc, and the basic hardness of the chain link is set such that no substantial cross-sectional or surface flow takes place as a result of the pressure created by the running roller, in particular with a permissible stretch-limit relationship or $R_e/R_m$ of about 1, preferably with a yield-strength relationship $R_e/R_m$ of about 0.65 with particular attention to ensuring a sufficiently plastic working possibility. Here $R_e$ is the yield strength and $R_m$ the tensile strength.

It is also preferably provided that the chain link is formed of standard materials, namely hardened steel, preferably with analysis values whereby manganese-sulfide formation is minimized with in particular when manganese steel is used a low sulfur content of less than 0.02%. In this manner material fatigue is avoided.

It is particularly provided that the chain link is formed of alternative materials, in particular with a hard-metal base, fiber-composition materials, ceramic/ceramic compounds and/or technical ceramics, preferably based on $Si_3N_4$ (silicon nitrate) with less than 15% by weight of sinter additive, a fracture growth in the subcritical region with a breaking strength KIC smaller than 20 MPa√m as well as similar materials such that the strength and the ductility are by means of the use and proportions of suitable materials set to an optimal value for the particular use of the chain link, with particular attention to the homogeneity (Weibull modulus m) and m is greater than 10 m.

As a result of the construction according to the invention the use of alternative materials is possible since these materials are as a result of the shape used by the instant invention in a normal-load situation only loaded with pressures that cannot be expected to crack out or destroy the material.

In addition it is preferably provided that the compound convexly arced curve of the side flanks of the running surfaces are formed over the entire length or only in portions of the chain link with their radii R and r preferably such that the parameter combination is $R/b1 \cong 2.4$ to 3.1 and $r/b1 \cong 0.05$ to 0.11 or is optimized taking into account various chain-link formations so that depending on the actual application an optimal shape with respect to strength and/or wear is quickly established automatically. The parameter b1 here is determined depending on the chain-link type and the particular link shape, this determination takes into account the shape of the part the running surface rides on (for example the shape of the running surface of the guide wheel or of the running roller) and the surfaces dependent thereon are paid attention to with respect to the forces effective on the side surfaces of the running-surface of the chain link.

The guide wheel, support roller and running roller according to the invention are characterized by modified running-surface shapes which are derived from the special running-surface shape of the piece they run on (e.g. the chain link) and also correspond to a constant nonlinear (arced) function or nonlinear/linear curve combination. A linear or nearly linear curve shape (e.g. a straight line is effective for the optimal technical/physical functioning of the pair of running surfaces—chain link/guide wheel or chain link/support or running roller—taking into account the special running-surface shape of the other piece. e.g. the chain link, for particular technical uses of running systems, conveyors, and chain systems of other constructions and function (e.g. high-speed systems, systems with special shock resistance, and the like) as particular embodiments of the running-surface shape of the guide wheel or of the support or running roller which is arranged at an angle to a normally horizontal running surface is advantageous when the size of the angle is preferably selected that it can also be arranged in accordance with the requirements of the special running-surface shape of the other piece (e.g. chain link) a strength- and wear-optimal shape of the running surfaces and side guide surfaces of the guide wheel or the support or guide roller are established in use as soon as possible all by themselves, in particular however a slope of 1:10 is realized or must be derived that these slopes of the running-part surfaces of guide wheels, support or running rollers are set for functional reasons in dependence on the geometry of the entire pair of running surfaces and are not identical with a purely accidentally occurring formation formed by certain manufacturing processes (e.g. casting) on the running surfaces of guide wheels or of support or running rollers.

It can also be good for particular technical embodiments of chain systems for strength- and/or wear-optimal reasons that the linear region of the running surface of the guide wheel or of the support or running roller that extends at an angle to an imaginary perpendicular to the running surface is formed as a special combination of differently angled curves (e.g. several straight lines at different angles to the imaginary straight running surface), preferably so that it automatically and quickly establishes in use the wear- and strength-optimal running-surface shape of the guide wheel or of the support or running roller taking into account the running-surface shape of the other piece of the running-surface pair (e.g. chain link), it being particularly preferable however with a curve combination of two straight sections relative to a running-surface cross section transverse (90°) to the travel direction (with outward slope of the running-surface shape) toward the edge inward is a linear or nearly linear segment of the running-surface shape with a slope of 1:20 and wherein the straight portion directed to the guide wheel or support or running-roll edge is sloped at 1:10 and in the opposite case of the slope (inward) this slope is oppositely set up.

The formation according to the invention of chain link, guide wheel, and support roller can also be used all by itself and is advantageous, but is usable in combination with the corresponding construction of the running surface of the chain link, the guide wheel, the running roller, and the support roller.

When complete chain segments comprised of two parallel chain links are put together and a corresponding chain is made of such chain segments, there is when for example it is used in the traction systems of caterpillar vehicles the effect that the entire chain segment takes a tipped position on the running roller on the guide wheel so that only the outer region of one of the two chain links which form a chain segment is directly in engagement with the carrying surface of the guide wheel or of the guide roller. If this is taken into account the object of the invention is achieved in that the running-surface shape of the link in cross section to the running-surface head transverse (90°) to the travel direction only corresponds to a nonlinear function on the outer-lying running surface regions of a chain segment with two parallel chain links, preferably to a compound or logarithmically compound convexly arced curve as strength- and/or wear-optimal running-surface geometry, preferably over half to two thirds of the width of the running surface of each chain link so that the shape of this part of the running-surface shape is particularly ideal in that it automatically establishes in accordance with the basics of mechanics the least stress during normal movement and use between a chain link while taking into account the overall chain segment working together preferably with a running roller over a long service life.

It is thus preferably provided that the running-surface shape in the region of the running surface in which the nonlinear function is not realized merges into another curve shape, preferably a linear or nearly linear straight or nearly straight curve parallel or nearly parallel to the opposite running surface (e.g. with respect to the standard embodiment of the running surface of a roller).

It can further preferably be provided that the edge of the running surface is formed in the region of the running-surface shape in which the nonlinear function is not realized by the transition radius, preferably in the parameter combination $r/b \doteq 0.05$ to $0.11$.

In an analogous manner the guide wheel can be so formed according to the invention such that the shape of the running surface or of the running surfaces of the guide wheel correspond transverse (90°) to the travel direction in cross section to a nonlinear function, preferably a compound or logarithmically concavely arced curve under the effect of an adequately curved opposite surface (e.g. the chain link) as a wear and/or strength-optimal rolling-surface geometry with respect to a part, e.g. half or two-thirds of the running surface, preferably the mirror image of the opposite running surface (e.g. that of the chain link) or a mirror-similar shape (e.g. taking into account the running-surface width of the guide wheel) and as determined on the basis of machines automatically establishes the least stress in normal movement between a running surface, e.g. that of a guide wheel, and a corresponding other piece. e.g. a chain link with a long service life.

Since based on the possible tipped position of the chain segment relative to the running roller or to the guide wheel in practice if possible the formation of the running surface corresponding to a nonlinear function or a compound shape first and mainly takes places on the chain-link outer sides, it is preferably provided that for the construction and the delivery of these chain links the corresponding shape is not provided over the entire running surface transverse to the travel direction, but only the respective chain link outer sides (relative to the chain segment) are provided in new condition with the nonlinear special compound arced surface shape. In this manner expense is saved in manufacture without however substantially badly affecting the desired performance An analogous formation of the running surface can also be used in the construction of the support roller.

BRIEF DESCRIPTION OF THE DRAWING

The above and other objects, features, and advantages will become more readily apparent from the following description, reference being made to the accompanying drawing in which:

FIG. 2 is an elevational view through a prior art chain link in a straight model;

FIG. 2A is a section taken along line IIA—IIA of FIG. 2;

FIG. 2B is a side elevational view of the link of FIG. 2;

FIG. 2D is an elevational view of another prior-art link;

FIG. 2E is a section taken along line IIE—IIE of FIG. D;

FIG. 2F is a side elevational view of the link of FIG. D:

FIG. 3 is a cross section like FIG. 1A through an embodiment of a chain link according to the invention;

FIG. 3A is a cross section like FIG. 1B through the link according to the invention;

FIGS. 4 and 4A are larger scale views of details of respective FIGS. 3 and 3A;

FIGS. 5 and 5A are views similar to FIGS. 4 and 4A but of another embodiment;

FIGS. 8 and 8A are views similar to FIGS. 3 and 3A showing a further variant;

FIG. 9 is a partial axial section through a guide wheel;

FIG. 22A and 22B are views similar to FIGS. 3 and 3A showing running surfaces of a chain link according to a further embodiment;

FIG. 23 is a view similar to FIG. 10 showing a further embodiment of the invention; and FIG. 24 is a view similar to FIG. 16 of another support roller.

SPECIFIC DESCRIPTION

FIGS. 1A through 1C and 2A through 2F show the state of the art. In these prior-art embodiments of chain links the running surface region 1 is shaped as a straight or nearly straight line, that is the running surface is in principle formed as a plane. This formation is disadvantageous with respect to wear and strength.

Figure 1B:
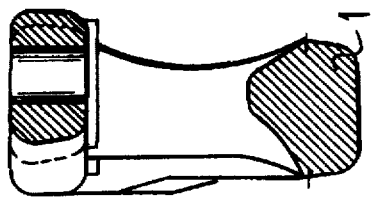
FIG. 1B is a cross section taken along line IB—IB of FIG. 1.
Figure 1C:
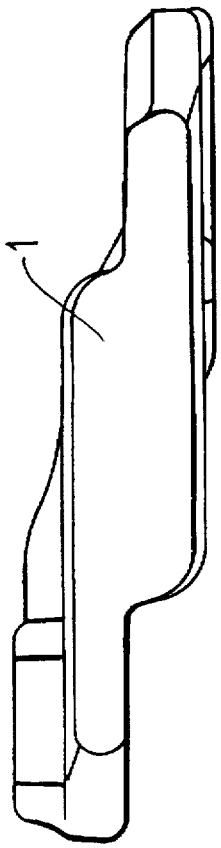
FIG. 1C is a side view in the direction of arrow IC of FIG. 1.
Figure 1:
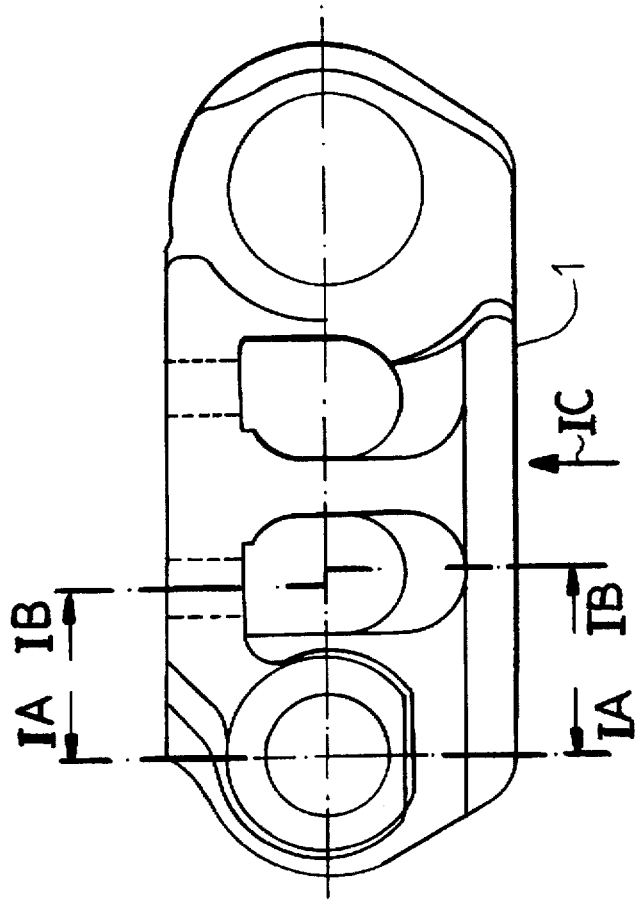
FIG. 1 is an elevational view of a standard prior-art chain link.
Figure 1A:
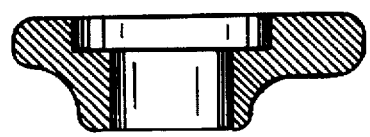
FIG. 1A is cross section taken along the line IA—IA of FIG. 1.

In FIGS. 1A through 1C an offset chain link is shown while in FIGS. 2A through 2F a straight chain link is shown.

In the embodiment according to FIGS. 3 and 3A the running-surface shape 2 of the chain link 3 seen in cross section to the running surface head (perpendicular to the travel direction) is shaped according to a nonlinear function, in particular as a compound convexly arced surface which corresponds to or is close to strength-optimal rolling-surface geometry.

In FIGS. 4 and 4A the shape of the compound curve running surface is determined by the parameter combination R/b of about 2.4 to 3.1 and r/b≡0.05 to 0.11 as a ratio of the radii of curvature of an edge region 4 having the radius R to a corner region 2" having the radius r and terminating at a side surface 2'". In the embodiment according to FIGS. 5 and 5A the same radii and parameter relationships are used in the center of the running-surface region and in the regions of the bolt or sleeve eye, with the running-surface shape correspondingly only in the lateral edge regions of the running-surface cross section to a shape corresponding to a nonlinear function and then subsequently going over to a shape of a linear or nearly linear function (straight part 4).

Figure 6:
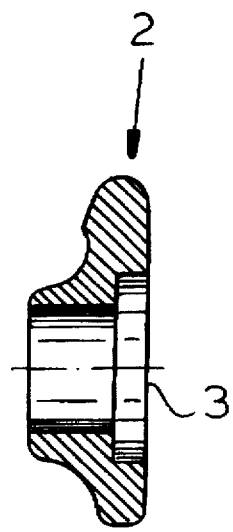
FIGS. 6 and 6A are views corresponding to FIGS. 3 and 3A of still another embodiment.
Figure 6A:
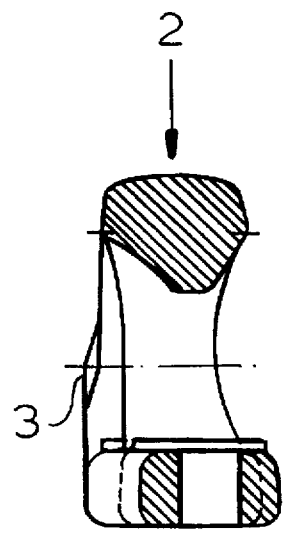

In the embodiment of FIGS. 6 and 6A there is in an offset chain link 3 the corresponding shape of the running surface 2 both in the central running-surface region (FIG. 6A) as in the region of the bolt eye (FIG. 6).

Figure 7:
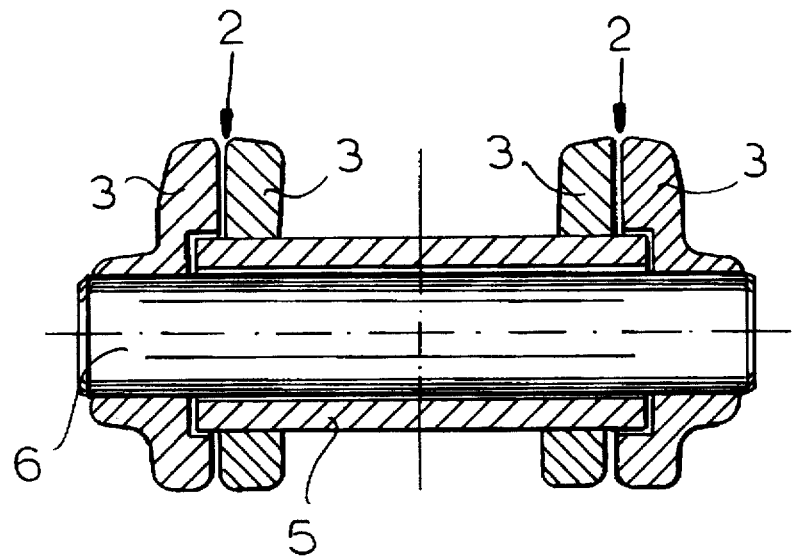
FIG. 7 is a cross sectional view through a hinge region of two chain links with a chain sleeve and a chain pin.
Figure 10:
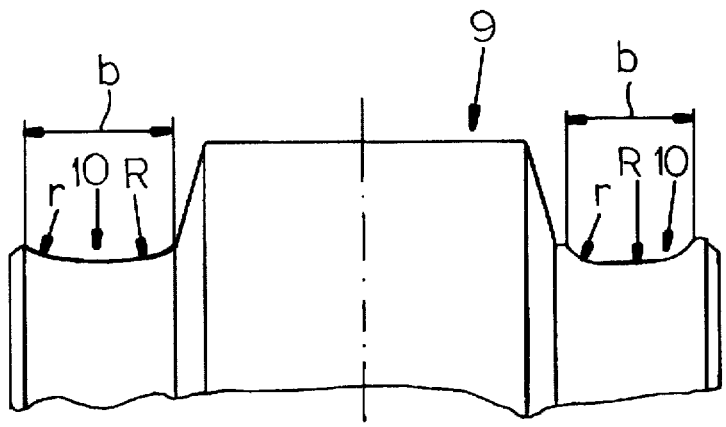
FIG. 10 is a view similar to FIG. 9 of a variant of the guide wheel.

In the embodiment according to FIG. 7 there is in an offset chain link 3 a hinge region with the chain link 3 completed with a chain sleeve 5 and a chain bolt 6. Thus the desired shape of the running surface 2 is such in the region of the bolt or sleeve eye, thus in the hinge region between two chain segments, that in this region the desired running-surface shape 2 is formed over the entire cross section of two chain links 3.

In the embodiment according to FIGS. 8 and 8A the shapes of the side flanks 8 to both sides of the running surface 2 of the chain link 3 are also a compound convexly arced curve region in the above-given size-order regions and relationships of the radii R and r.

In FIGS. 9 through 15 a guide wheel 9 is shown for guiding and/or deflecting or tightening track chains, transport chains, or similar chain types. To this end the shape of the running or support surface 10 of the guide wheel 9 transverse to the travel direction in cross section corresponds to a nonlinear function, in particular a compound convexly arced curve which corresponds to or is close to a strength- and/or wear-optimized rolling-surface geometry.

Figure 11:
FIG. 11 is a fragmentary elevational view illustrating a further variant.

As in particular visible from FIG. 11 the radii R and r of the compound convex curvature of the running surface are characterized by the parameter combinations R/b of about 2.4 to 3.1 and r/b≡0.05 to 0.11. The parameter b thus is dependent on the shape of the other part, that is for example on the chain link running on the running surface 10 of the guide wheel 9 and of the thereto related force transmission to the running surface 10 of the guide wheel 9.

Figure 11A:
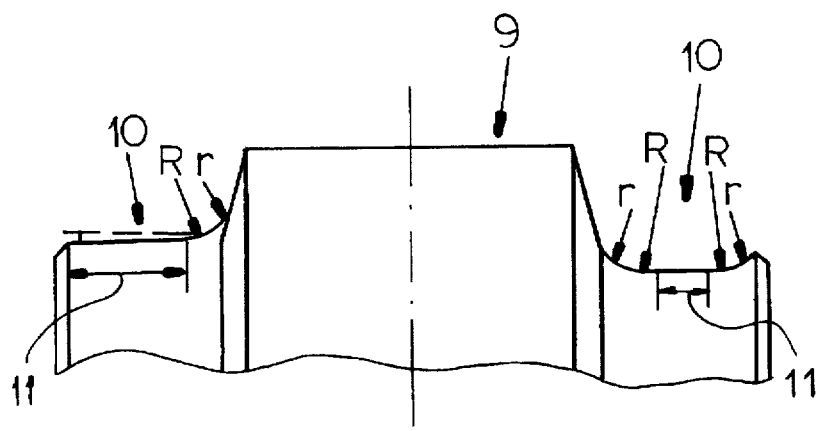
FIG. 11A is a view similar to FIG. 10 of still another variant.

As visible in FIG. 11A the nonlinear curve of the shape of the running surface 10, preferably the compound convexly curved shape, can only be created in part, that is the edge radii, for example the edge radius r as well as the running surface radius R are set such that they merge into a linear or nearly linear curve shape of the running-surface shape, for example a straight region 11. The linear or nearly linear curve shape of the running surface 10 can also be set in a corner to a presumed horizontal running surface as in FIG. 11A on the left (See also FIGS. 18A and 18B.) with the angle preferably so chosen that the wear- and strength-optimal running surface is set by itself as quickly as possible in use while taking into account the special running-surface shape of the other part of the running surface pair (e.g. the chain link), in particular set with an inclination of 1:10.

The imaginary straight line of the running surface is thus shown in a dashed line and the respective facing inclined surface in solid lines.

Figure 11B:
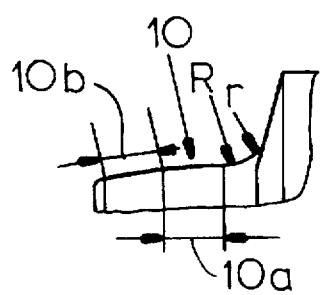
FIG. 11B is a fragmentary view similar to FIG. 11 showing a modification.
Figure 12:
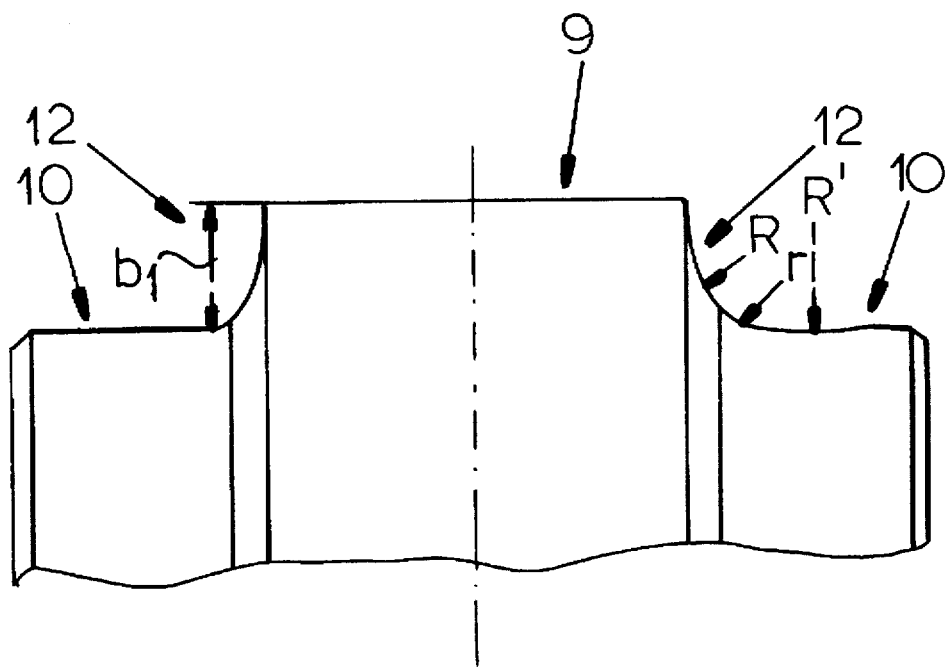
FIGS. 12, 13, 14, and 15 are views similar to FIG. 11 showing further variants of the guide wheel.

As also shown in FIG. 11B, (and in FIGS. 18A and 18B) the linear or nearly linear curve shape can also be formed as a combination of curves with different inclinations wherein two combined straight or nearly straight sections with one section 10a (16a in FIGS. 18A and 18B) at 1:20 and the section 10b (16b in FIGS. 18A and 18B) at 1:10. The same is true for the support roller and running roller. According to FIG. 12 the shape of the lateral guiding surfaces 12 of the central flange of the wheel 9 corresponds to a compound concavely arced curve with the radii R and r of the compound arced curve preferably at the ratio of R to b1 of about 2.4 to 3.1 and r/b1 about equal to 0.05 to 0.11.

Figure 13:
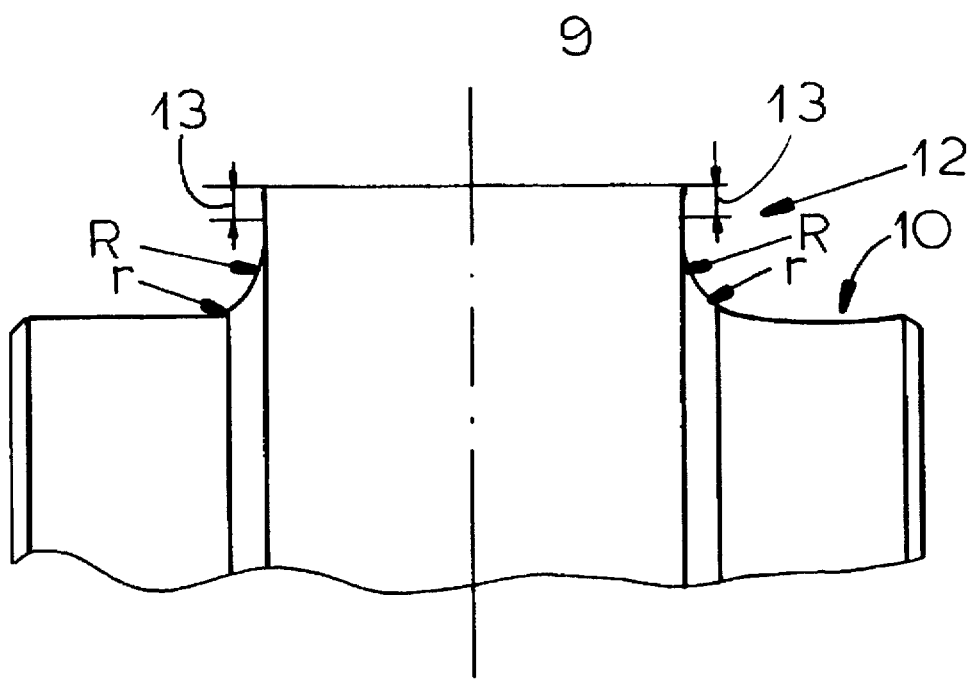

As also shown in FIG. 13 the compound concavely arced shape of the lateral guiding surfaces 12 of the central flange of the guide wheel 9 can be only partially formed, with the edge radius r and the running-surface radius R such that they merge into a linear or nearly linear function of the shape of the lateral guiding surfaces 12 of the central flange of the guide wheel 9. The straight regions are shown at 13.

Figure 14:
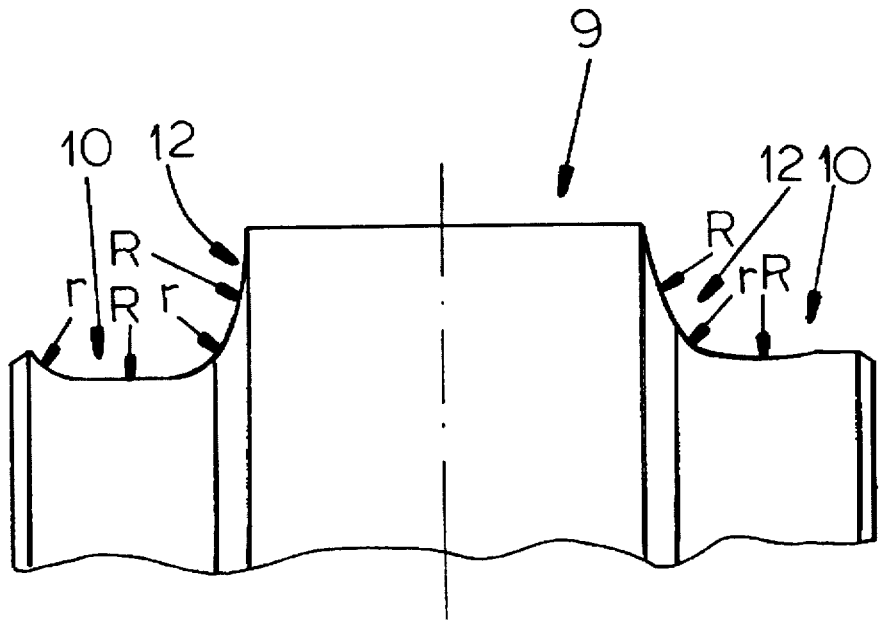
Figure 15:
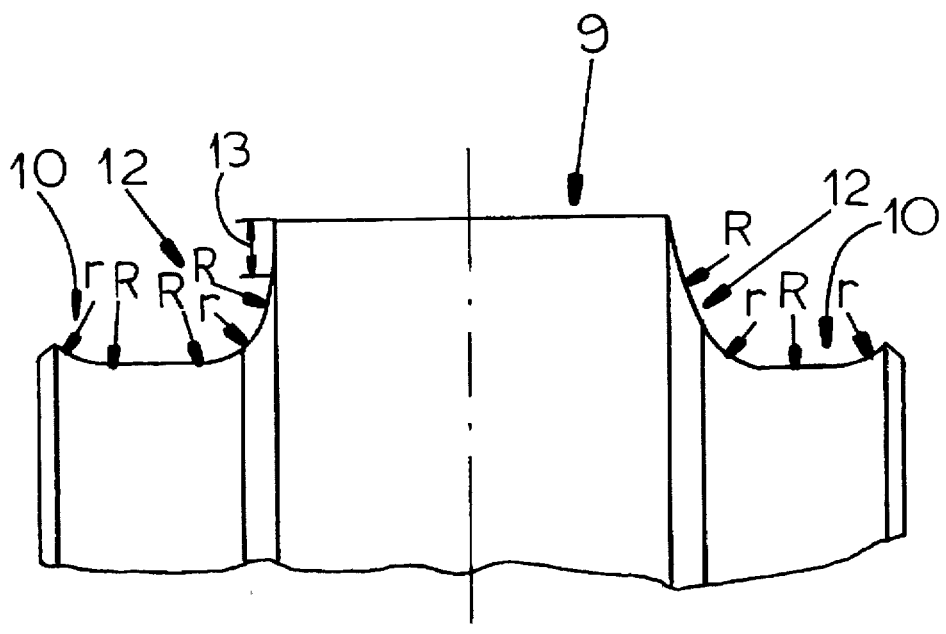
Figure 16:
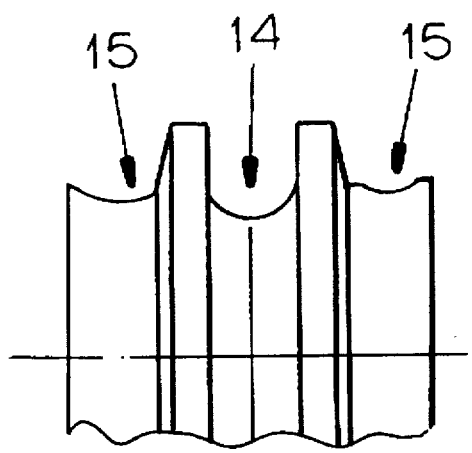
FIGS. 16, 16A and 16B are fragmentary views of support and guide rollers according to the invention in additional embodiments.
Figure 16A:
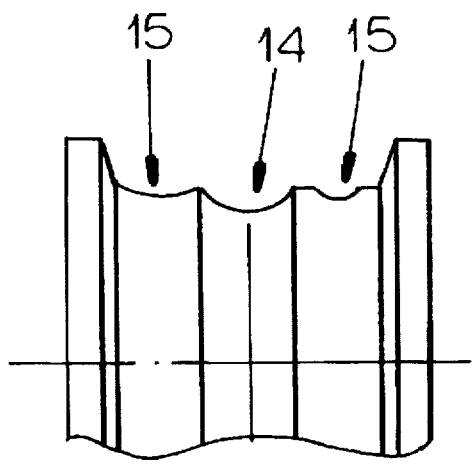
Figure 16B:
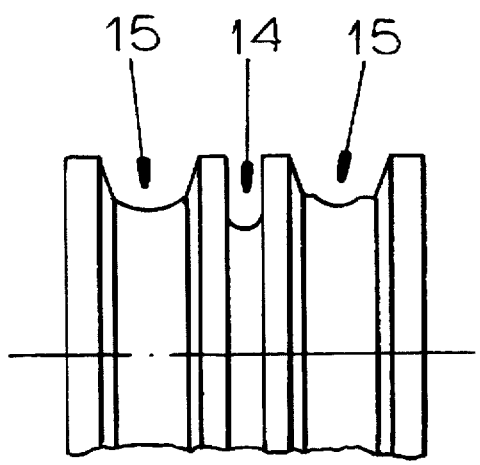

As visible from FIGS. 14 and 15 the nonstraight preferably compound concavely arced shape of the running surface 10 of the guide wheel 9 as well as the similarly curved shape of the side guiding surfaces 12 of the central flange of the guide wheel 9 are combined with each other such that both curve shapes whether of a nonlinear base (see FIG. 14) or even combined with linear or nonlinear bases (see FIG. 15) merge into one another such that a strength- and/or wear-optional overall shape is produced and the radii R and r of the compound concavely arced over-all shape are characterized by the above-described dimensional relationship.

Figure 17:
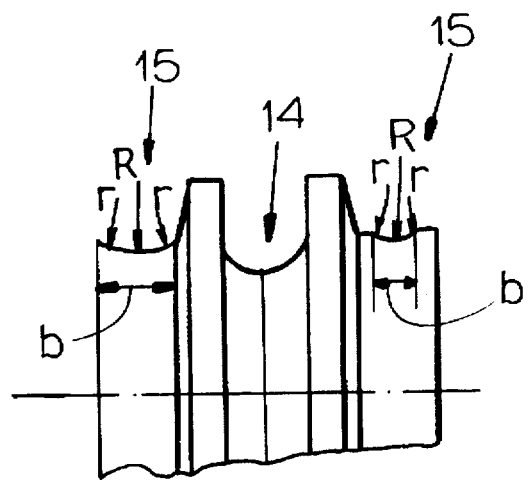
FIGS. 17, 17A and 17B are views similar to FIGS. 16, 16A and 16B of still other embodiments.
Figure 17A:
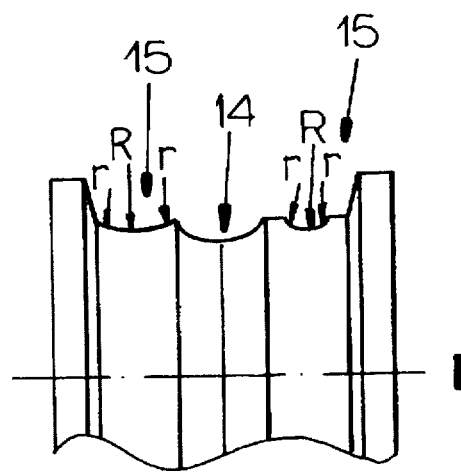
Figure 17B:
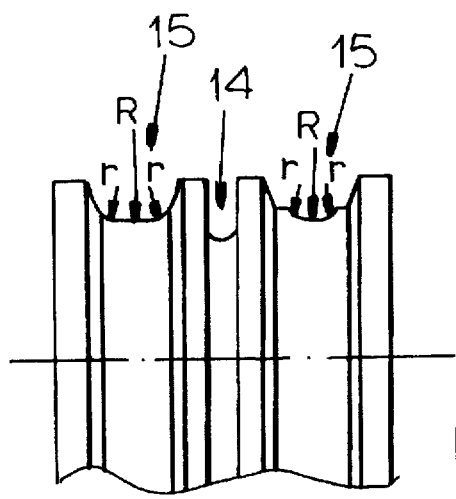

FIGS. 16 to 20 finally each show a support roller 14 for supporting and guiding traction chains, transport chains, or similar types of chains or usable as a guide roller for ensuring the rolling function and transfer of force to traction chains, transport chains, and/or similar chain-like things becoming necessary with the running mechanism. Even herein the shape of the running surfaces 15 of the support or running roller 14 correspond seen perpendicular to the travel direction in section to a compound concavely arced curve (as in particular visible in FIG. 16). With respect to FIGS. 17, 17A, and 17B, the radii R and r of the compound concave curve of the running surface are preferably characterized by the parameter relationship $R/b \geqq 2.4$ to $3.1$ and $r/b \geqq 0.05$ to $0.11$.

The parameter b is thus to be quantified by the shape of the other part, that is for example of the chain link riding on the running surface of the support or running roller 14 and the associated force applied to the running surface.

Figure 18:
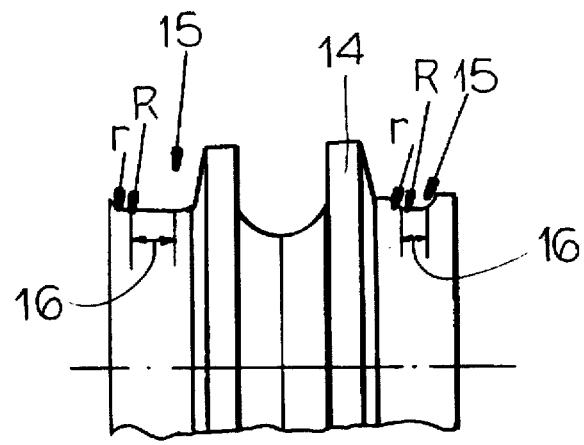
FIGS. 18, 18A and 18B show, in views similar to FIGS. 16, 16A and 16B, further embodiments.
Figure 18A:
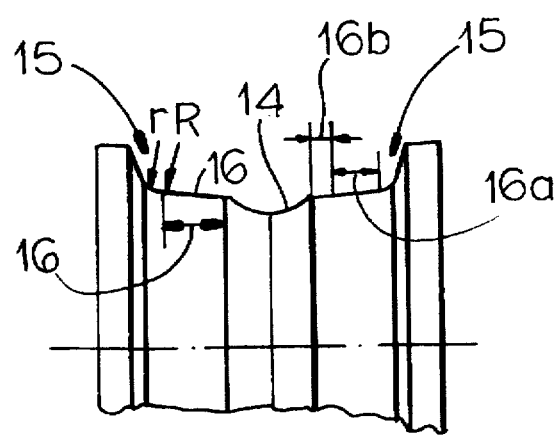
Figure 18B:
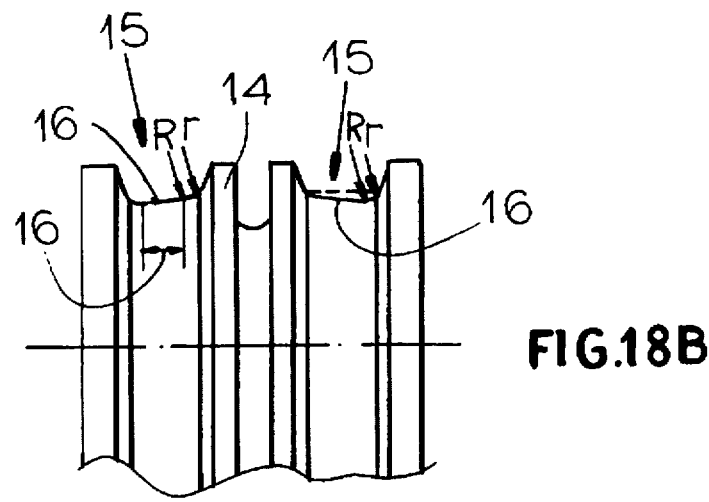

As in particular visible in FIGS. 18, 18A, and 18B the nonstraight curve shape of the contour of the running surfaces 15 is only partially employed, that is the edge radii, for example the edge radius r, as well as the running surfaces radii, for example the running-surface radius R, are set such that they merge into a linear or nonlinear function of the running-surface shape, for instance a straight line 16.

Here the same embodiments as above are described with reference to the running surface of the guide wheel, in FIG. 18 the running-surface shapes 16a and 16b.

Figure 19:
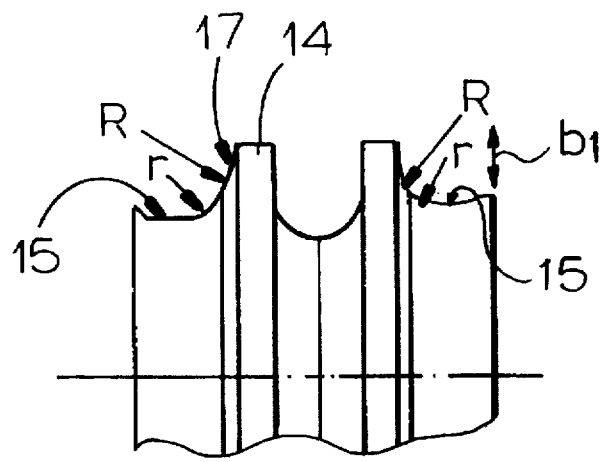
FIGS. 19, 19A and 19B are views similar to FIGS. 16, 16A and 16B of other embodiments.
Figure 19A:
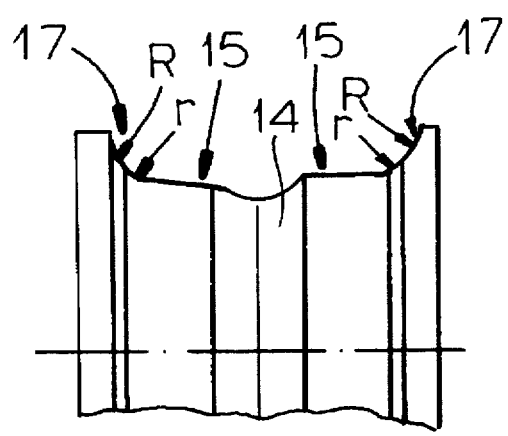
Figure 19B:
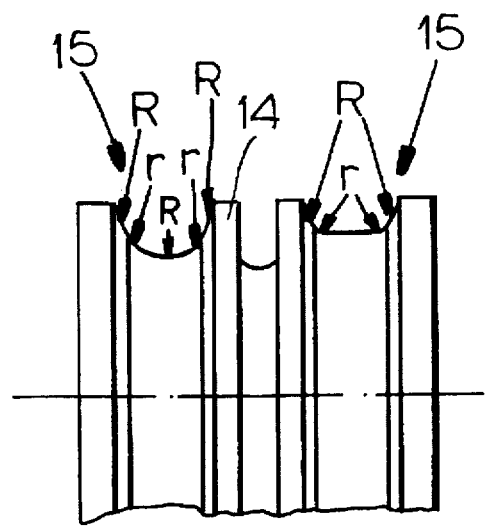

In the embodiment according to FIGS. 19, 19A, and 19B the shapes of the side guiding surfaces 17 of the rim of the support or running roller 14 are conformed in cross section to a nonlinear function, in particular a compound concavely arced curve where the radii R and r of the compound arced curve are formed by the relationship $R/b1 \geqq 2.4$ to $3.1$ and $r/b1 \geqq 0.05$ to $0.11$.

Figure 20:
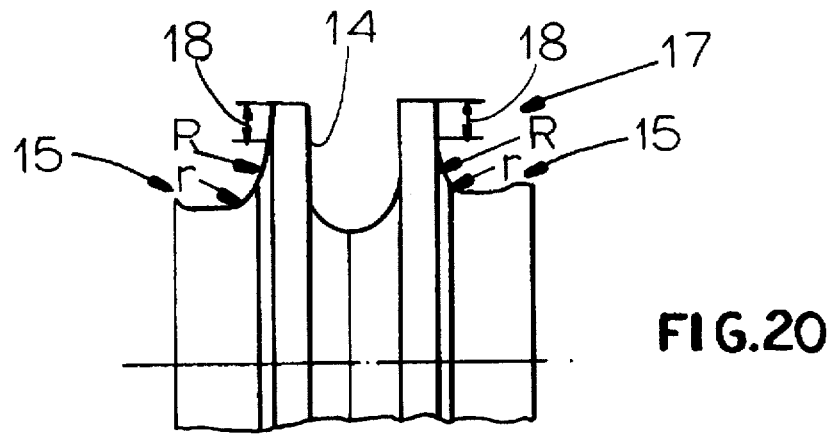
FIGS. 20, 20A and 20B are also views similar to FIGS. 16, 16A and 16B of still other embodiments.
Figure 20A:
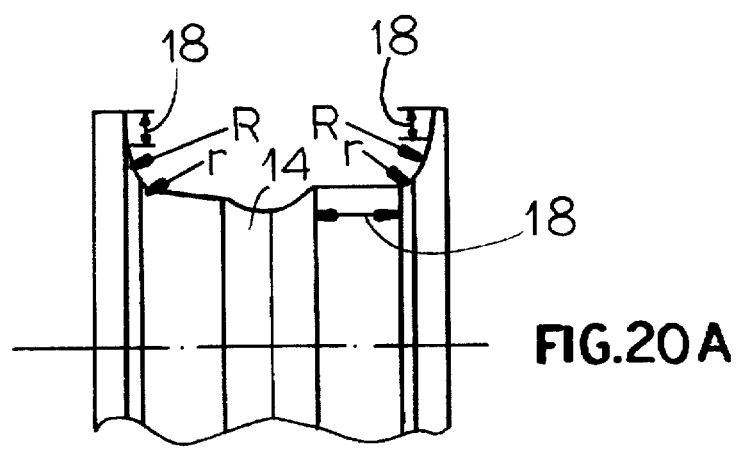
Figure 20B:
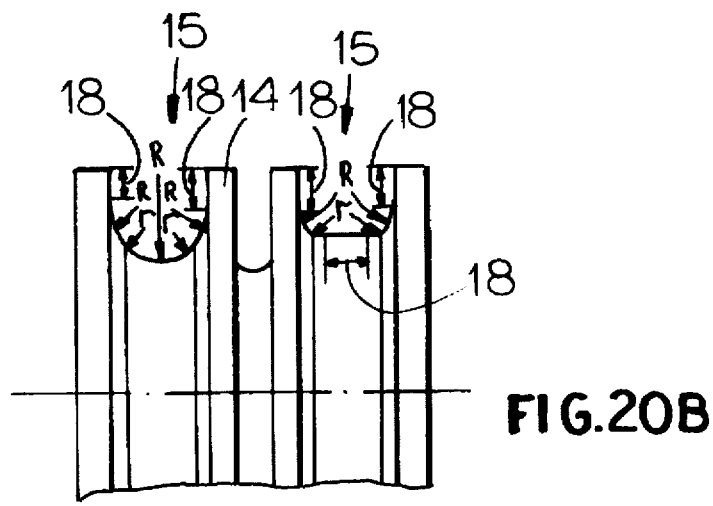

FIGS. 20, 20A, and 20B show how the nonlinear preferably compound arced shape of the side guiding surfaces at the edges of the support or running roller 14 are only partially formed, that is the edge radii, for example the edge radius r, as well as the running-surface radii, for example the running-surface radius R, are chosen so that they merge into a linear or nearly linear function 18 of the shape of the side guiding surfaces of the edges of the support or running roller 14. In this manner the nonlinear, preferably compound arced shape of the running surfaces of the support and running rollers 14 and the corresponding shape of the side guiding surfaces 17 are combined such that both curves merge into one another on a purely nonlinear bases as well as on a combined linear/nonlinear basis.

Figure 21:
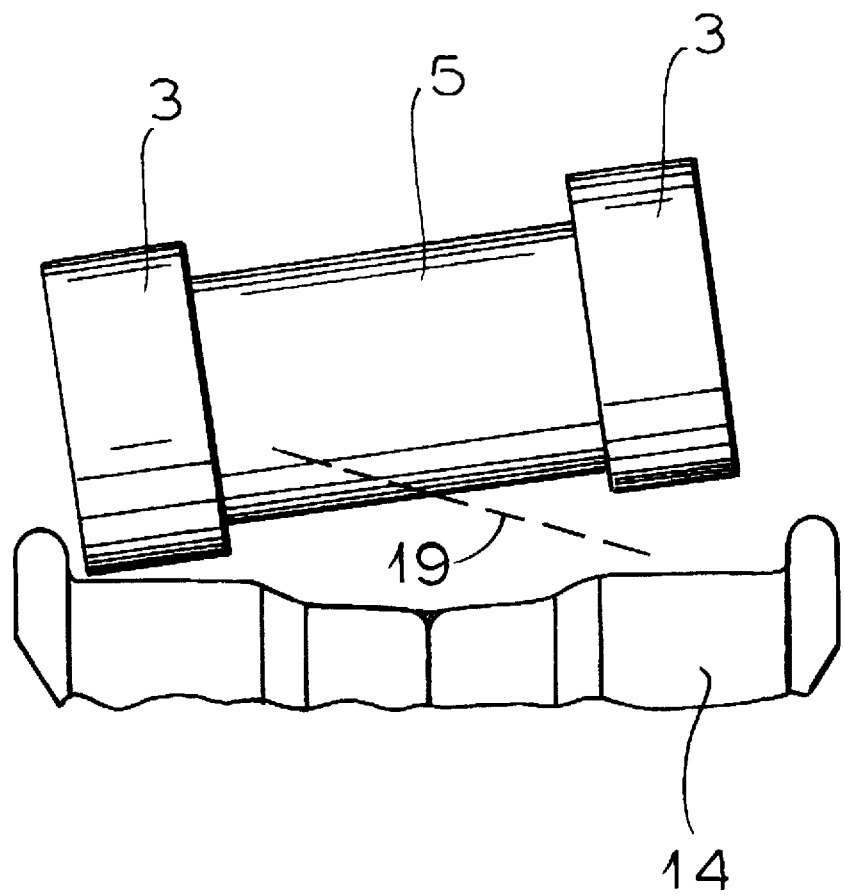
FIG. 21 is a diagram illustrating a drive condition of a chain segment relative to a guide roller.

FIG. 21 shows the possible tipped position of a chain segment relative to a support roller 14. The chain-link segment thus is formed by two chain links 3 which are connected to each other by a chain sleeve 5 or a chain bolt. According to FIG. 21 it is possible that the chain segment assumes a tipped position relative to the support roller 14 or even relative to the guide wheel. In FIG. 21 one possible position is shown in solid lines while the other possible tipped position is shown by a dashed line 19. In a construction with a traveling chain, guide wheel and running wheel as customarily used in a tracked caterpillar drive when there is a tipped position as shown in FIG. 21, this means that during use of such a chain segment the compound shape will at first or exclusively be formed by the outer sides of the chain links. As a result of this possibility a preferred construction is that the chain link is provided corresponding to FIGS. 22A and 22A only on the chain-link outer side (in FIGS. 22A and 22B upper right) with nonlinear preferably compound convexly arced running-surface shapes 2. In this manner when there is produced in region 2 a strength- and/or wear-optimal running-surface geometry in a partial region of the running-surface shape, this running-surface shape 2 extends over half to two-thirds of the width of the running surface of the chain link 3. The remaining region which is indicated with arrow 20 is formed otherwise, preferably as a straight or nearly straight surface which preferably is formed parallel or nearly parallel to the opposite running surface of the support roller of the guide wheel. Preferably this region is straight and extends substantially parallel to the pivot axis of the chain link which is shown at 21. Even in this arrangement the relationships of the transition radius r relative to the width b of the entire running surface is such that the relationship r/b is about equal to 0.05 to 0.11.

The corresponding formation in a guide wheel 9 is shown in FIG. 23. Here the shape of the running surfaces or the running surfaces 2 of the guide wheel 9 is formed transverse (at 90°) to the travel direction in cross section to a nonlinear function, preferably a compound or logarithmically concavely arced curve corresponding to the adequately curved opposite running surface of the chain link 2 as wear- and/or strength-optimal geometry with this particular formation of the running surface being made only in the relatively outerlying regions of the running surface 2 of the guide wheel 9, in fact over from half to two-thirds of the width of the running surface. This surface corresponds generally to the mirror image of the opposite running surface of the chain link 2 or is at least generally mirror symmetrical or similar to this shape. The corresponding shape is worked into the new part, this shape corresponding to a shape which will give a longer service life according to the invention.

Even here the relationship of radius R to the width of the corresponding running surface b and the transition radius r relative to the width of the running surface b is done in the manner laid out above.

FIG. 24 shows the same relationships with reference to a running roller 14. Here the corresponding shape formation is only provided in the region 2 of the running surface while the region 20 can also be formed as in the above-described embodiments, in particular straight and parallel to the pivot axis 22 of the running roller or of the guide wheel.

The invention is not restricted to the illustrated embodiments but can be varied widely within the scope of the disclosure.

All new individual or combination features described in the description and/or the drawing are considered important to the invention.

We claim:

1. In combination with a rotatable drive/support element having a support surface, a chain link having a hardened running surface extending in and adapted to ride in a longitudinal travel direction on the support surface and a side surface also extending in the travel direction and normally out of contact with the element, the running surface having a predetermined width b and being formed of at least one edge region having an outwardly convex arcuate shape seen in the travel direction having a radius R of curvature; and a respective corner region extending from the edge region to the side surface and of an outwardly convex arcuate shape seen in cross section having a radius r of curvature, wherein $r/b \cong 0.05$ to $0.11$.

2. The combination defined in claim 1 wherein $R/b \cong 2.4$ to $3.1$.

3. The combination defined in claim 1 wherein the running surface has adjacent the edge region a noncurved region.

4. The combination defined in claim 1 wherein $R/b < 2.4$ and $r/b \cong 0.075$ to $0.11$, the entire running surface being of convex arcuate shape seen in cross section.

5. The combination defined in claim 1 wherein the running surface has two such side surfaces, two such edge regions adjacent the side surfaces, and two such corner regions each joining a respective one of the edge regions to the respective corner region.

6. The combination defined in claim 5 wherein the running surface is formed between the edge regions with a substantially flat center region.

7. The combination defined in claim 5 wherein the two edge regions join centrally on the running surface, whereby the entire running surface is arcuate.

8. The combination defined in claim 1 wherein the support surface has a shape generally complementary to the edge and corner regions of the running surface.

9. The combination defined in claim 1 wherein the running surface has a hardness between 30 HRc and 60 HRc.

10. The combination defined in claim 1 wherein the running surface has a hardness between 40 HRc and 50 HRc.

11. The combination defined in claim 1 wherein the running surface is made of a manganese-steel alloy.

* * * * *